Figure 1:
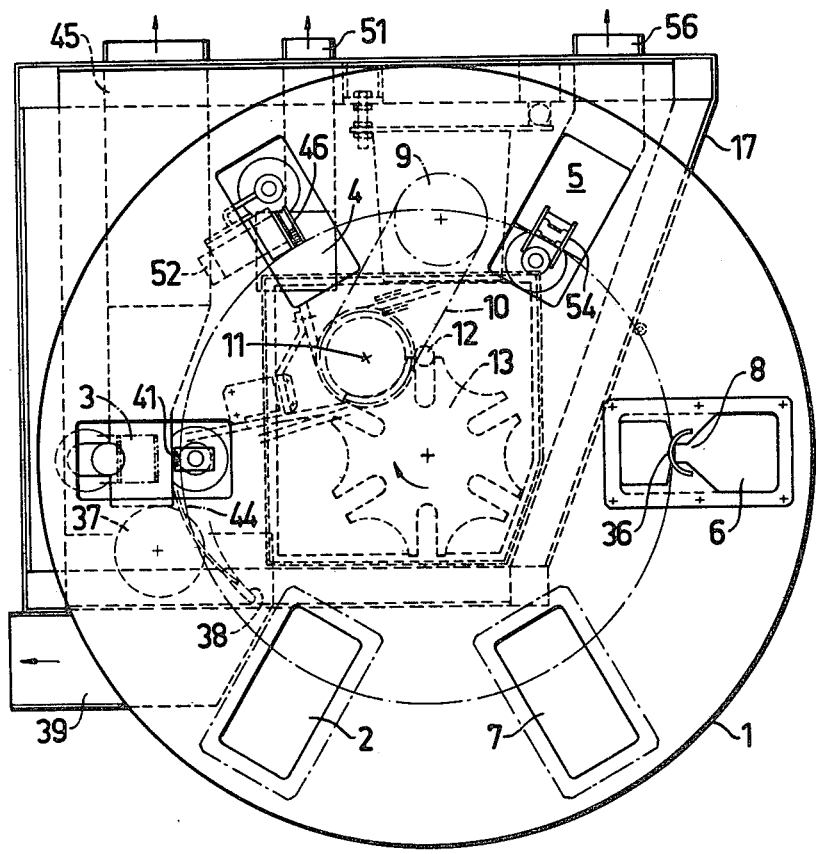

United States Patent [19]

Olsson

[11] 4,329,761
[45] May 18, 1982

[54] SQUIDS CLEANING MACHINE

[75] Inventor: Sven Olsson, Hälsingborg, Sweden

[73] Assignee: Societe d'Assistance Technique pour Produits Nestle S.A., Lausanne, Switzerland

[21] Appl. No.: 202,650

[22] Filed: Oct. 31, 1980

[30] Foreign Application Priority Data

Nov. 15, 1979 [SE] Sweden .............................. 7909425

[51] Int. Cl.³ .............................................. A22C 29/00
[52] U.S. Cl. ................................................... 17/71
[58] Field of Search ................... 17/53, 71, 72, 73, 74, 17/75, 76

[56] References Cited

U.S. PATENT DOCUMENTS 3,605,180 9/1971 Harris et al. .............................. 17/74
3,947,921 4/1976 Berk .......................................... 17/71

FOREIGN PATENT DOCUMENTS 631364 6/1936 Fed. Rep. of Germany .......... 17/71
293583 1/1971 U.S.S.R. .................................. 17/53
341461 7/1972 U.S.S.R. .................................. 17/53
351524 10/1972 U.S.S.R. .................................. 17/53
596205 3/1978 U.S.S.R. .................................. 17/53

Primary Examiner—Willie G. Abercrombie
Attorney, Agent, or Firm—Vogt & O'Donnell

[57] ABSTRACT

The invention relates to an apparatus for trimming molluscs, especially squid. According to the invention, the apparatus comprises a number of successive stations of treatment, consisting of (a) holding means (8) for holding the squid during trimming; (b) a cutter (37) for cutting the tentacles of the squid; (c) means for loosening (41) and gripping (43) of the head and viscera of the squid and extraction of these; (d) means (46) for removing part of the tissue from the inside of the mantle of the squid at the part where the pen is located; (e) means (54) for gripping and extracting the pen; and optionally (f) means (58) for removal of the squid from the holder (8); and (g) means (1) for transport of the squid between the treatment stations.

9 Claims, 10 Drawing Figures

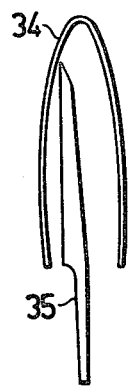
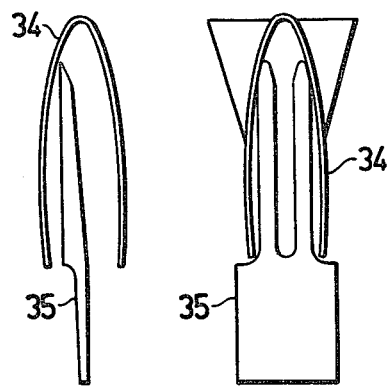
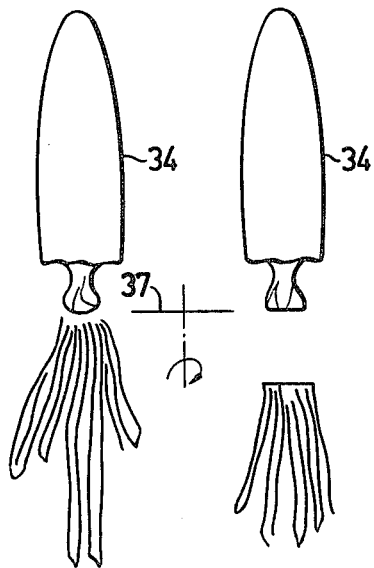
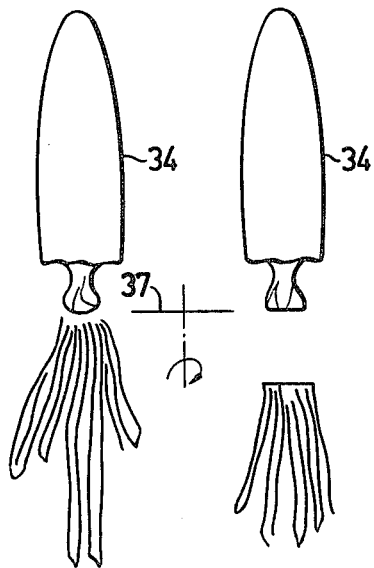
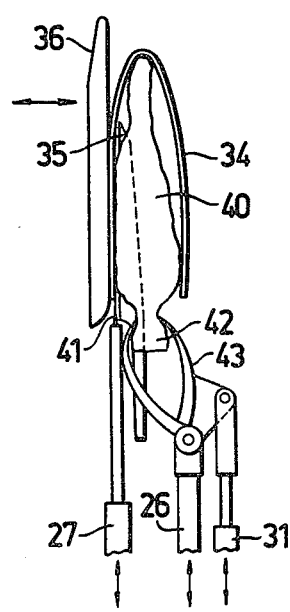
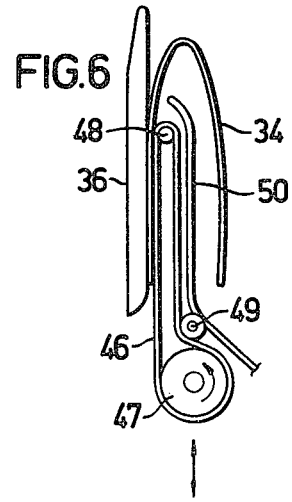

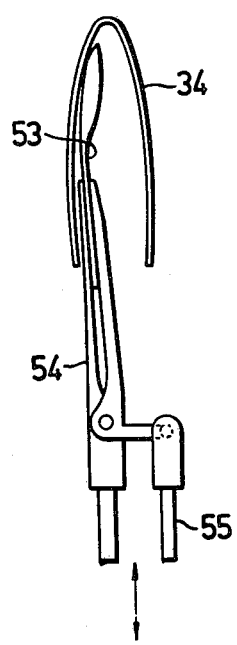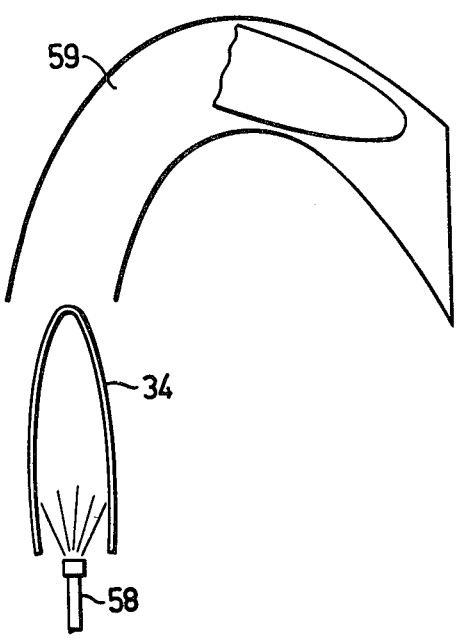

SQUIDS CLEANING MACHINE

This invention relates to an apparatus for trimming molluscs, especially squid.

The squid or cuttlefish (*Loligo vulgaris, Sepia officinalis* and other species) is a foodstuff much appreciated in many countries.

The squid is built of a fusiform trunk or mantle, which is provided with two longitudinal fins or "wings", and encloses the internal organs, such as the digestive system, inksack, gills, etc. The internal organs end in the head with the ten arms or tentacles, two of which are longer than the others. The rudimentary shell or "pen", which usually consists of a fusiform disc of chitin, at times with lime deposits, is embedded in the mantle wall. The viscera are attached to the interior mantle wall alongside it at the place where the pen is embedded, but are otherwise relatively loose from the mantle.

The parts of the cuttlefish usually eaten consists of the mantle and sometimes the tentacles. For the preparation of squid for consumption, it is thus necessary to remove the head and viscera and the pen from the mantle, and if it is desired to utilize the tentacles, also to separate these from the head. The wings and a thin surface skin covering the outside of the mantle are usually also removed from the trimmed mantle.

The trimming of squid in the production of squid rings is rather difficult and must be carried out in several steps. The head with its associated viscera must first be loosened from the inside of the mantle and then be pulled out from the mantle, after which the pen is removed. This may often be difficult, as the pen is embedded in the muscle tissue of the mantle wall, which is sometimes rather tough. If the tentacles are to be utilized, they are usually severed from the head before this has been removed from the mantle. For these reasons, trimming of squid has so far mostly been carried out manually, which will be uneconomical when large amounts are handled. It is clear that there would be great advantages in respect of economy and personnel if trimming of squid could be done mechanically as much as possible. However, up to now there has been no apparatus available that can do this efficiently and with a good result.

U.S. Pat. No. 3,947,921 describes an apparatus for trimming and eviscerating of squid. In this apparatus, the mantle of the squid is clamped between movable rolls, while the head and its associated viscera are pulled out. The mantle is thereafter led between a series of pairs of rolls with a successively decreasing distance between the rolls in each pair and successively increasing peripheral speeds. It is stated that the pen is loosened and freed and the surface skin on the mantle is removed by this mechanical working of the mantle. However, it has been found that a working in this known apparatus is not satisfactory to remove the pen safely, but mostly it remains. Furthermore, no complete removal of the viscera is obtained when the head is pulled out, as the connection between the viscera and the mantle wall is not cut. These shortcomings are eliminated by the present invention.

An apparatus for the trimming of squid according to the invention comprises the following stations:

(a) a station for attaching the squid to holding device for holding it securely during trimming;

(b) a station with a cutter for cutting the tentacles of the squid, its head remaining;

(c) a station with a cutting device for loosening the viscera of the squid from its mantle wall, and a gripping device for gripping and extracting the head of the squid with its associated viscera;

(d) a station for removal of at least a part of the tissue on the inside of the mantle located over the pen in the squid;

(e) a station with a gripping device for gripping and extracting the pen from the mantle; and optionally (f) means for removing the trimmed mantle from the holding means and transporting the mantle for further treatment, and (g) means for conveying the holding means with the squid successively through the stations (a)-(f) and returning the holding means to the station (a) for receiving a new squid.

In a preferred embodiment of the invention, the various treatment stations are arranged in a circular array and the holding means with the squid is successively transported stepwise to each of the stations. After finished trimming of a squid, the holding means has in this way been returned to the starting position, and a new treatment cycle can be started.

The invention is illustrated more in detail in the accompanying drawing, which shows a suitable embodiment of the apparatus according to the invention. However, it should be noted that the invention is not restricted to only the embodiment shown but that modifications and variations are possible within the scope of the claims.

Figure 2:
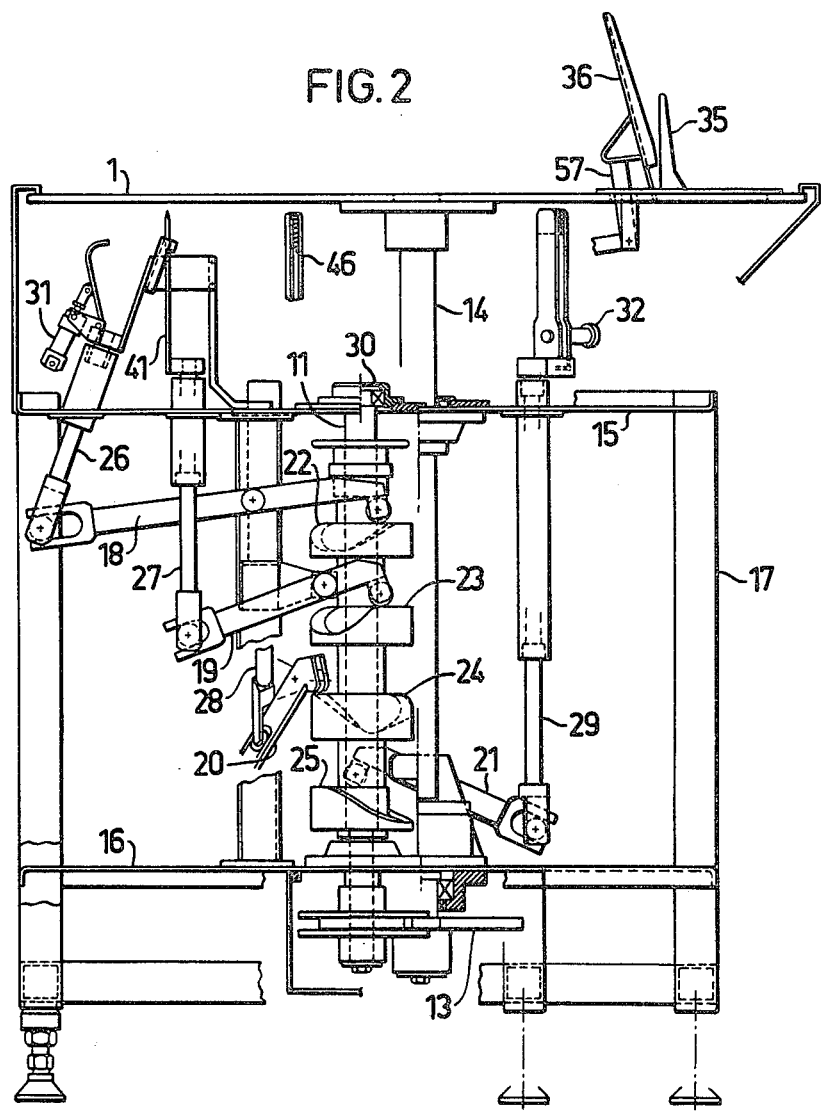

In the drawing, FIG. 1 is a schematical top view of an apparatus according to the invention. FIG. 2 is a lateral view of the same apparatus, and FIGS. 3-8 shows schematically the treatment of the squid at the various treatment stations.

According to FIG. 1, the apparatus comprises a rotatable table 1, in which equally spaced apertures 2-7 close to the periphery of the table are made. The various means of treatment are arranged to treat the squid through the apertures, the squid being attached to holding means generally designated by 8 and arranged over the apertures so that the means of treatment may work upon the squid. A holder is arranged over each of the apertures, but for the sake of clarity, only one of them is shown in the position 6.

The table is adapted to be rotated so that each aperture is moved one step to the position of the immediately preceding aperture, the holding means with the squid being brought along. In the drawing, six apertures are shown, and thus each movement comprises 1/6 revolution. The stepwise movement is to be achieved by means of a Maltese cross mechanism known per se, where a drive motor 9 drives the main shaft 11 via e.g. a chain 10, the main shaft giving the Maltese cross 13 a stepwise rotating movement via the pin 12, said cross being attached to a shaft 14 of the table. Other means for achieving an intermittent rotation, such as step motors of various construction, are also possible.

Just under the apertures in the table, when this is in resting position, the various stations of treatment are arranged. One exception is the station (b) for severing the tentacles, which is located under the table disc between the two resting positions of the apertures in the table which are designated by 2 and 3, respectively. In position 3, the station (c) for loosening the attachment of the viscera to the mantle wall and extraction of the head with its accompanying viscera is arranged. In position 4 the station (d) for removal of part of the tissue in the mantle wall in front of the position of the pen in the mantle is disposed, and in the position 5 the station (e) for gripping and extracting the pen from the mantle. In position 6 the trimmed squid mantle can be removed from the holding means and be transported further for additional steps of treatment, such as removal of the wings and the surface skin. The removal from the holding means can be carried out manually or mechanically in a special treatment station (f).

FIG. 2 is a schematical lateral view of an apparatus according to the invention along the line II—II in FIG. 1. Here it is shown how the table 1 is supported by its shaft 14 with the Maltese cross 13, which is driven by the main shaft 11. The main shaft and the various treatment stations are supported by two supporting planes 15 and 16 which, in their turn, are supported by a stand 17, which is only suggested in the drawing.

The different treatment devices in the apparatus are actuated by means of levers 18, 19, 20 and 21, which are guided in a way known per se by cam discs 22, 23, 24 and 25. The levers are connected with push rods and draw rods 26, 27, 28 and 29 for the operation of the various stations of treatment. The main shaft is driven by the drive motor 9 (FIG. 1) and is supported in the upper supporting plane 15 at the bearing 30.

The various stations of treatment are served by compression cylinders, which are shown at 31 and 32, and motors, one of which is shown at 53 in FIG. 1.

The function of the apparatus is described in further detail in the following.

At station (a), the squid is attached to a holder, as is shown in FIGS. 3 and 3a, which show the mantle 34 of the squid attached to the holder 35 and seen from the side (FIG. 3) and from the front (FIG. 3a). The holder is made as a U-shaped device with the two prongs of the U arranged against the mantle on each side of the position in the mantle where the pen is located. The attachment of the viscera to the mantle wall will then be between the two prongs. The attachment of the squid to the holder is preferably carried out manually in the present case. The height of the holder over the table 1 is adapted so that the squid will hang with its head downwards on a level with the table and with the tentacles hanging down through the aperture in the table. As is shown in FIG. 2, the holder 35 can also be supplemented with a support plate 36 bent in a semi-circle, which supports the mantle during the various stages of treatment.

While the squid is moved from position 2 to position 3 in FIG. 1 it is passed by a cutter, which cuts the tentacles. In a preferred embodiment, the cutter consists of a rotating knife 37 arranged close to the underside of the table, which knife has preferably a circular form and the rotation of which is conveniently started when the head or tentacles of the squid touch a sensor arm 38. The cut tentacles fall down into a chute 39 and can then be utilized as they are considered a tasty part of the squid in many cases. When the squid has passed the rotating knife and no longer is in contact with the sensor arm, the rotation of the knife is stopped so that energy is not consumed unnecessarily. Cutting of the tentacles in the station of treatment (b) is also illustrated schematically in FIGS. 4 and 4a, where FIG. 4 shows the squid before the contact with the schematically indicated rotating knife 37, and FIG. 4a shows the squid after cutting of the tentacles.

In the treatment station (c), which is located at position 3 in FIG. 1, the attachment of the viscera 40 to the mantle is loosened and the head with its associated viscera is pulled out. This is also shown schematically in FIG. 5. For the loosening of the attachment of the viscera to the mantle wall, a narrow knife blade 41 is moved vertically upwards in the space between the two prongs of the U-shaped holder 35 and the mantle 34. The upper end of the knife blade is formed into a shallow U or V and is provided with a cutting edge, which cuts off the connection between the viscera and the mantle wall. At the same time as the connection is cut off, the head 42 is seized by gripping means 43 which is moved upwards by means of the rod 26, which is actuated by the lever 18 and the cam disc 22. The gripping means consists of a gripping claw, which is closed by means of a compression cylinder 31, which is actuated through a sensing arm 44. By guidance from the cam disc 22 via the lever 18, the rod 26 is then drawn downwards while the gripping means retains the head. In this way the head with its associated viscera will be pulled out from the mantle. By the influence of the sensing arm 44, the compression cylinder 31 will then open the gripping means 43, so that the head and the viscera will fall into the chute 45, after which they can be removed. The upward and downward movement of the knife blade 41 is controlled by the cam disc 23 via the lever 19 and the draw and push rod 27.

The holder with the mantle of the squid is then moved further to the position 4 in FIG. 1 with the treatment station (d) where part of the tissue in the part of the mantle located above the pen is removed. This is necessary in order that the pen might be loosened safely, and a preferred embodiment of how this can be carried out is shown in FIG. 6. According to this, a narrow, driven grinding or rasping band 46 is introduced into the mantle 34, which band grinds or rasps away part of the tissue in the mantle over the place where the pen is located. The band should thus be introduced into the mantle between the two arms in the U-shaped holder 35, where the pen is located. The grinding or rasping band is driven by means of a drive roll 47 and guided via the guide rolls 48 and 49. In order to simplify the introduction of the band in the mantle a guide plate 50 may be arranged on the opposite side of the active part of the band. The ground-off tissue material falls down into the chute 51 (FIG. 1) and can be removed therefrom.

The band is driven by a motor 52, and by means of a suitably arranged sensor arm (not shown) it is achieved that the band is only driven when inserted into the mantle. The whole assembly of the band and its drive motor are moved vertically by means of the push and draw rod 28, which is guided by the cam disc 24 via the lever 20.

In the treatment station (e) which is located at position 5 in FIG. 1, the pen is grasped and pulled out from the mantle. This is shown in greater detail in FIG. 7. The pen 53 is seized by a clamping device 54, which is operated by a link 55 of a compression cylinder, which is indicated at 32 in FIG. 2. The clamping device is moved vertically be means of the draw and push rod 29, which is guided by the cam disc 25 via the lever 21. By suitable sensing means (not shown) it is achieved that the clamping device grasps the pen when it has been moved to its upper position and releases the pen when it has been pulled out from the mantle. The pen is released into the chute 56, from which it can be removed.

The grasping of the pen 53 can be facilitated by pressing the lower part of the mantle forwards against the gripping means, whereby the pen will protrude somewhat from the mantle wall. Alternatively, the upper part of the mantle can be inclined backwards from the gripping means. This is illustrated in FIG. 2, where it is shown how the support plate 36 can be inclined backwards from the holder 35 by means of the link 57, which can be actuated by a compression cylinder (not shown) or by a link system in contact with a cam disc on the main shaft 11 (not shown).

After removal of the pen, the trimmed mantle can be removed from the holder 35 for further treatment, such as rinsing, removal of surface skin and wings and cutting into rings. This can be done manually, but can also be carried out mechanically in a treatment station (f), the process being schematically illustrated in FIG. 8. According to the Figure a stream of water or compressed air is directed into the mantle 34 from the nozzle 58. The mantle will then be released from the holder 35 and thrown out into a discharge chute 59 directing it to further treatment. This station can be arranged in position 6 in FIG. 1.

After the removal of the mantle, the holder 35 can receive a new squid, which is attached at position 7 or 2 in FIG. 1, after which the treatment cycle is repeated.

The dimensions of the various parts of the treating devices can be adapted to the size of the treated squid. As squid can vary very considerably as to size from a length of some dm up to half a meter and more, the length of the tentacles not included, it is necessary to sort the squid into size groups before the trimming, said groups being adapted to the apparatuses used in each specific case. Usually the squid have a length of about 20-30 cm. A dimensioning of the working parts of the apparatus to be adapted to a suitable size of the treated squid can easily be carried out by one skilled in the art on the basis of what has been indicated in the present specification.

The drive of the apparatus with its various treatment devices is preferably pneumatic using compressed air motors and compressed air cylinders. The apparatus will operate in a very moist environment, and as foodstuffs are to be treated, it must often be cleaned in a way irreproachable from a hygienic point of view, e.g. by high pressure washing. Therefore electrically operated drive means are less suitable due to the risk of shorts in the moist environment. If the necessary safety measures can be taken, such as suitable encapsulation etc., it is, however, in principle nothing that prevents electric operation of at least part of the apparatus, such as the drive of the main shaft. Hydraulic operation is also possible in certain cases.

For similar reasons, mechanical control of the various means of treatment via cam discs and levers is used, as shown in the drawing. If electric operation can be used, it is also possible to control the means of treatment electronically via a program unit in ways known per se to one skilled in the art.

As materials for the apparatus such ones are to be used which are suitable for use in the handling of foodstuffs and in a moist environment. Here, stainless steel has been found to be suitable. The mere mechanical construction of the machine elements included in the apparatus can be easily established by one skilled in the art on the basis of what has been indicated in the present specification.

In the foregoing, the apparatus according to the invention has been described with reference to the preferred embodiment, in which the various stations of treatment are arranged in a circular form, and the squid are moved from one station to the other by being placed on a stepwise rotating table. However, it is realized that this is not the only possible embodiment. The holders for the squid can, for example, arranged on a conveyor, which in part is made to perform an intermittent movement in a straight line. The holders are then stopped at stations of treatment, which are arranged along a straight line, but otherwise act in the same way as indicated above. If the conveyor is arranged in a closed loop, the holders can be returned to the starting position after finished trimming and removal of the trimmed mantles, in which position a new treatment cycle can be started. The changes in design and the operation of the various means of treatment required can easily be worked out by one skilled in the art against the background of what has been indicated in the foregoing.

By the present invention an apparatus is provided, which makes possible mechanical trimming and preparation of squid for preparation into a foodstuff in a way that is simple and economically advantageous.

I claim:

1. An apparatus for the mechanical trimming of molluscs, especially squid, characterized in that it comprises
    (a) a station for attachment of the squid to holding means for holding it during the trimming;
    (b) a station having cutting means for cutting the tentacles of the squid, leaving its head;
    (c) a station having a cutter for loosening the viscera of the squid from its mantle wall, and with gripping means for gripping and extracting the head of the squid with its associated viscera from the mantle;
    (d) a station having means for removing at least part of the tissue on the inside part of the mantle located above the pen in the squid;
    (e) a station having gripping means for gripping and extracting the pen from the mantle, and optionally
    (f) a station having a device for removing the trimmed mantle from the holding means and transport of the mantle for further treatment; and
    (g) means for transporting the holding means with the squid successively through the stations (a)-(f) and for returning the holding means to the station (a) for receiving a new squid.

2. The apparatus of claim 1, characterized in that the holding means consists of a U-shaped device for introduction into the mantle of the squid in such a way that the two prongs of the U are inside the mantle and rest against it on each side of the pen.

3. The apparatus of claim 1, characterized in that the cutter for removing the tentacles consists of a rotating knife.

4. The apparatus of claim 1, characterized in that the cutter for loosening the viscera consists of a knife blade, which is introduced into the mantle close to its wall at the part thereof where the pen is located.

5. The apparatus of claim 1, characterized in that the means for removing the tissue on the inside of the mantle consists of a driven grinding or rasping band, which is introduced into the mantle.

6. The apparatus of claim 1, characterized in that the means for gripping and extracting the pen comprises a device for pressing the mantle forwards towards the gripping means at the outer end of the pen so that this end is released, and a clamping device for gripping and extracting the pen.

7. The apparatus of claim 1, characterized in that the means for removing the trimmed mantle consists of a device for blowing compressed air into the mantle so that it is freed from the holding means.

8. The apparatus of any of claims 1-7, characterized in that the stations of treatment (b)-(f) are arranged in a circular form and the holding means with the squid is stepwise successively conveyed to the treatment stations.

9. The apparatus of claim 8, characterized in that a plurality of holding means are arranged in a circular form on a rotatable table, and that the stations of treatment (b)-(f) are arranged along the circumference of the circle, an aperture being arranged in the table at each holding means, through which apertures the means for treatment at the stations can treat the squid.

* * * * *

UNITED STATES PATENT AND TRADEMARK OFFICE
CERTIFICATE OF CORRECTION

PATENT NO. : 4,329,761
DATED : May 18, 1982
INVENTOR(S) : Sven Olsson

It is certified that error appears in the above—identified patent and that said Letters Patent is hereby corrected as shown below:

Column 7, claim 8, line 1 "any of claims" should read --any one of claims--.

Signed and Sealed this

Twelfth Day of October 1982

[SEAL]

Attest:

GERALD J. MOSSINGHOFF

Attesting Officer     Commissioner of Patents and Trademarks